United States Patent
Okuno

[11] 3,779,355
[45] Dec. 18, 1973

[54] CENTRIFUGAL CLUTCH
[75] Inventor: Yoshihiro Okuno, Toyonaka, Japan
[73] Assignee: Kabushiki Kaisha Daikin Seisaku-Sho, Osaka Prefecture, Japan
[22] Filed: Oct. 26, 1971
[21] Appl. No.: 192,162

[30] Foreign Application Priority Data
Oct. 29, 1970 Japan.......................... 45/107898

[52] U.S. Cl. ............. 192/105 BA, 192/76, 188/185
[51] Int. Cl. ............................................ F16d 43/14
[58] Field of Search ............... 192/105 BA, 105 BB, 192/105 CD, 103 B, 76, 88 B; 188/185

[56] References Cited
UNITED STATES PATENTS

| | | | |
|---|---|---|---|
| 2,626,033 | 1/1953 | Lewis et al. .................. | 192/105 BA |
| 1,690,543 | 11/1928 | Linderman .................... | 192/105 BA |
| 2,166,165 | 7/1939 | Linderman ....................... | 192/88 B |
| 2,626,034 | 1/1953 | Fawick .......................... | 192/105 CD |
| 2,753,967 | 7/1956 | Bowers........................... | 192/105 BA |

*Primary Examiner*—Benjamin W. Wyche
*Attorney*—Holman & Stern

[57] ABSTRACT

A centrifugal clutch in which two brackets are mounted on the opposite ends of a clutch boss and each formed with guide projections and saddle-like arcuate shoes each having a lining and a guide recess fitted with each pair of the opposing guide projections of the brackets so as to be movable radially of the clutch. A stud pin extends between each pair of the opposing guide projections. Holding portions are formed at the circumferentially opposite ends of each of the shoes. Springs each having a longitudinally middle portion in engagement with the outer periphery of each of the stud pins and opposite ends caught on the holding portions urge the shoes toward the center of the clutch, but the outward movement of the opposite ends of the springs is limited by restricting portions at the opposite ends of the shoes when they are forced outward under the action of a centrifugal force. The springs or guide plates on the inner faces of the shoes prevent the shoes from removing from the guide projections in the axial direction of the clutch.

3 Claims, 8 Drawing Figures 3,779,355

CENTRIFUGAL CLUTCH

BACKGROUND OF THE INVENTION

The present invention relates to a centrifugal clutch.

OBJECTS AND SUMMARY OF THE INVENTION

An object of this invention is to provide a centrifugal clutch wherein the clutch shoes are so arranged as to be movable correctly in radial directions when subjected to a centrifugal force so as to permit each of the shoes to effect uniform and efficient clutching action without possible inclination.

Another object of this invention is to provide a centrifugal clutch wherein the springs for retaining the shoes in the disengaged position operate always in a stable condition to enable the shoes to achieve efficient clutching action, with the springs further being capable of imparting additional pressure on the shoes when the shoes are brought into pressing contact with the inner drum of the clutch, while being free of an excess stress to be otherwise produced therein, and capable of retaining the shoes in position.

Still another object of this invention is to provide a centrifugal clutch which is easy to assemble.

In accordance with the present invention, there is provided a clutch which comprises two brackets mounted on the opposite ends of a clutch boss and each formed with a plurality of radially extending guide projections, saddle-like arcuate shoes each having a lining and a guide recess fitting with each pair of the opposing guide projections of the brackets so as to be movable radially of the clutch, stud pins extending between and secured to each pair of the opposing guide projections, holding means formed at the circumferentially opposite ends of each of the shoes, spring means each having a longitudinally middle portion in engagement with the outer periphery of each of the stud pins and opposite ends caught on the holding means so as to urge the shoes toward the center of the clutch, and restricting means formed at the circumferentially opposite ends of the shoes for limiting the outward movement of the opposite ends of the spring means when the spring means are forced outward under the action of a centrifugal force, with the spring means preventing the shoes from removing from the guide projections in the axial direction of the clutch.

The present invention will become more apparent from the following description of the preferred embodiments with reference to the accompanying drawings, in which:

DETAILED DESCRIPTION OF THE EMBODIMENTS

Figure 1:
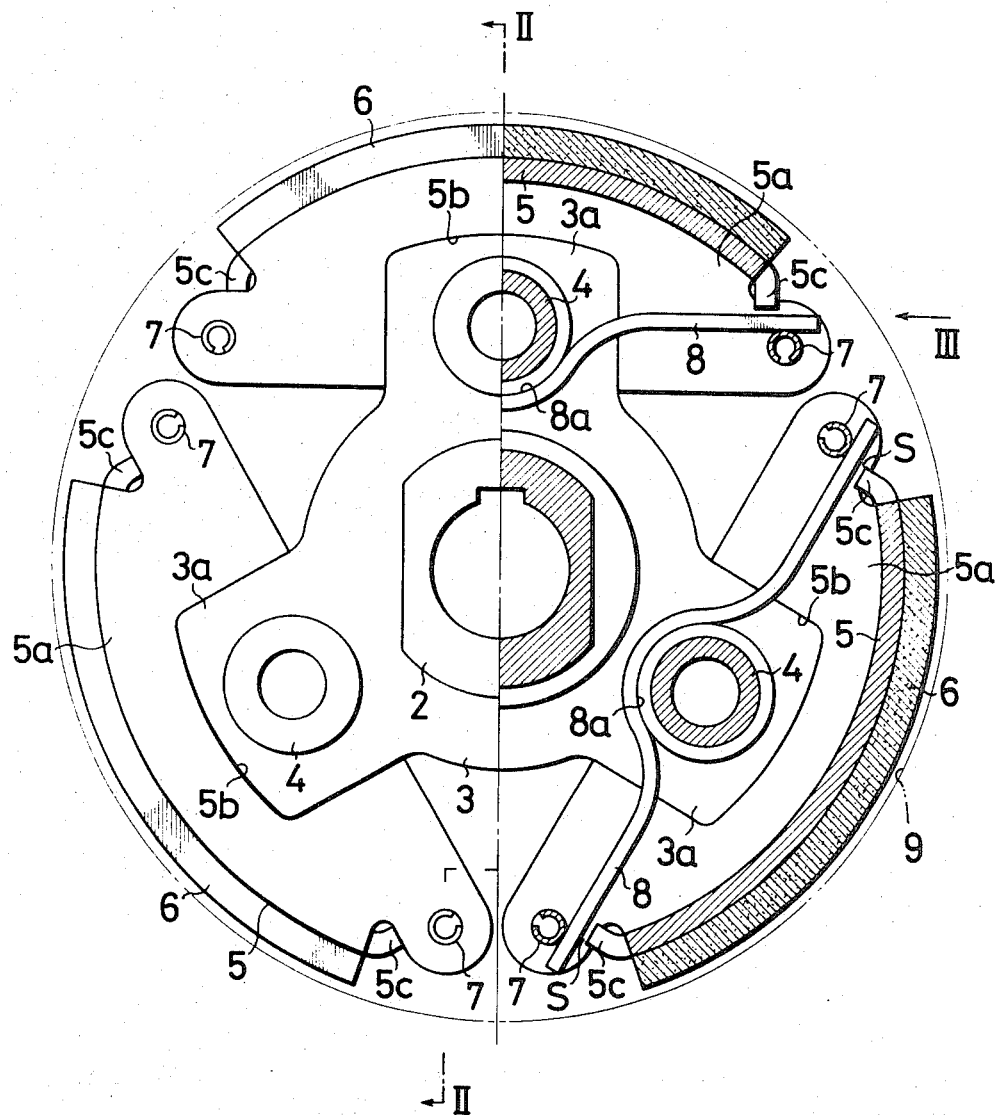
FIG. 1 is a front view partly in section of an embodiment with part shown in section.
Figure 2:
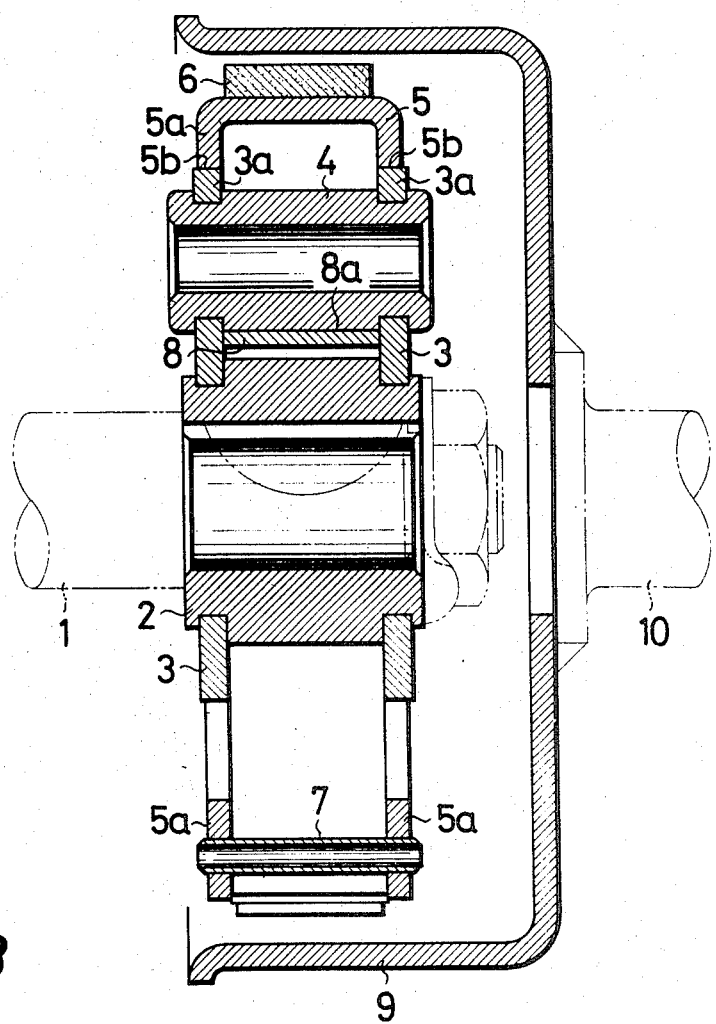
FIG. 2 is a view taken along the line II—II in FIG. 1, the view looking in the direction of the arrows.
Figure 3:
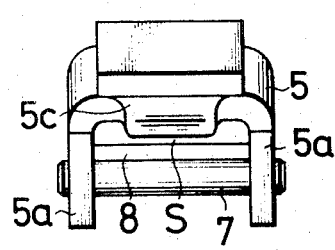
FIG. 3 is a side elevation showing the principal part as seen in the direction of the arrow III in FIG. 1.

Referring to FIGs. 1, 2 and 3, there is shown a clutch of this invention including a clutch boss 2 secured to the end of an input shaft 1. Two brackets 3 arranged in parallelism are fixed to the opposite ends of the boss 2, with each of the brackets 3 being formed with a plurality of guide projections 3a which extend in radial directions. A stud pin 4 extends between each pair of the opposing guide projections 3a of the two parallel brackets 3. The pins 4 are secured to the projections 3a. Each of arcuate and saddle-like shoes 5 is in the form of a channel in section and is provided, on its arcuate outer peripheral surface, with a lining 6 of a frictional material. Guide recesses 5b are formed in opposite side plates 5a of the shoe 5 and fitted with the guide projections 3a of the brackets 3. Thus, the parallel side edges of the guide projections 3a permit the shoe 5 to move only in the radial direction of the clutch. Holding pins 7 are mounted on the circumferentially opposite ends of the side plates 5a of the shoe 5. The longitudinally middle portion of a return spring 8 defined a leaf spring includes a bent portion 8a in conformity with the outer periphery of the stud pin 4. The opposite ends of the return spring 8 are arrested by the holding pins 7, with the midportion 8a thereof in engagement with the stud pin 4, the arrangement being such that the return spring 8 urges the shoe 5 toward the center of the clutch. The shoe 5 is further formed, at the opposite ends of its outer periphery, with restricting projections 5c for the return spring 8 with a small clearance S being provided between the return spring 8 and the restricting projection 5c.

When the input shaft 1 is driven, the shoes 5 in engagement with the brackets 3 are also driven integrally therewith. While the input shaft 1 is driven for idle rotation, the centrifugal force acting on the shoes 5 is so small that the restoring force of the return springs 8 will overcome the centrifugal force to keep the shoes 5 retracted toward the center of the clutch. Accordingly, the linings 6 are still out of contact with the inner face of a drum 9 on the output side and power transmission will not be effected.

As the input shaft 1 is driven at a greater speed, the centrifugal force acting on the shoes 5 increases and overcomes the restoring force of the return springs 8, causing the shoes 5 to move outward along the guide recesses 3a until the linings 6 are brought into pressing contact with the inner face of the drum 9. The frictional engagement therebetween now achieves power transmission to an output shaft 10.

To disengage the clutch, the input shaft 1 is slowed down, whereby the centrifugal force decreases permitting the restoring force of the return spring 8 to overcome the centrifugal force and return the shoes 5 toward the center of the clutch. As a result, the linings 6 are brought out of contact with the inner face of the drum 9 to terminate power transmission.

Since the shoe 5 is in the form of a saddle as illustrated and is guided in the radial direction of the clutch for clutching action by means of the guide projections 3a of the brackets 3 fixedly mounted on the clutch boss 2, it is assured that the shoe 5 will always move correctly along a line extending radially from the center of the clutch. The return spring 8 disposed in a space defined by the two brackets 3 and side plates 5a of the shoe prevents the shoe 5 from axial removal and dropping off the place by virtue of the fact that the return spring 8 has the greatest possible width in conformity with the width of the space, in so far as the action of the return spring 8 is not interfered with.

Further because the return spring 8 includes at its midportion the bent portion 8a in engagement with the stud pin 4 and opposite ends retained in position in resilient contact with the holding pins 7, the return spring 8 will be prevented from displacement in its longitudinal direction during the rotation of the clutch. Thus, the return spring remains stable in its operation. The arrangement wherein the holding pins 7 deliver the force of the spring 8 to the opposite ends of the shoe also precludes any possibility of the shoe 5 inclining with respect to the center of the clutch as it is moved along the guide projections 3a. The holding pins 7 further assure the ease of assemblage when the return spring 8 is built in.

As already described, the movement of the return spring 8 is limited by the restricting projections 5c at its opposite ends when these ends are forced off the holding pins 7 outward under the action of the centrifugal force during high speed rotation of the clutch. In this manner, the return spring 8 is protected from an excess stress to be otherwise produced and the centrifugal force acting on the return spring 8 can be imparted to the shoe 5 by way of the restricting projections 5c to thereby cause the lining 6 to press the inner face of the drum 9 with an increased pressure.

Figure 4:
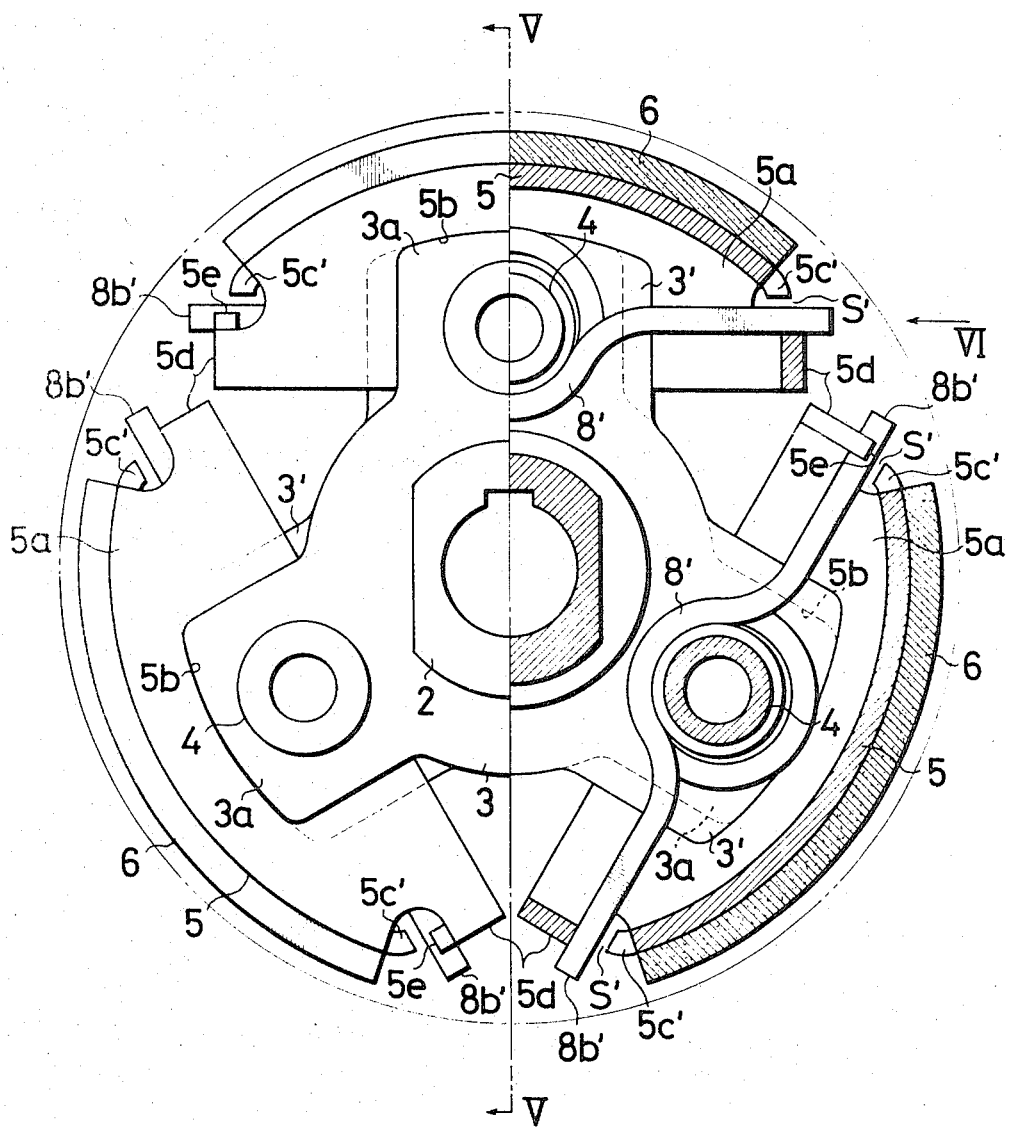
FIG. 4 is a front view partly in section of a modified embodiment
Figure 5:
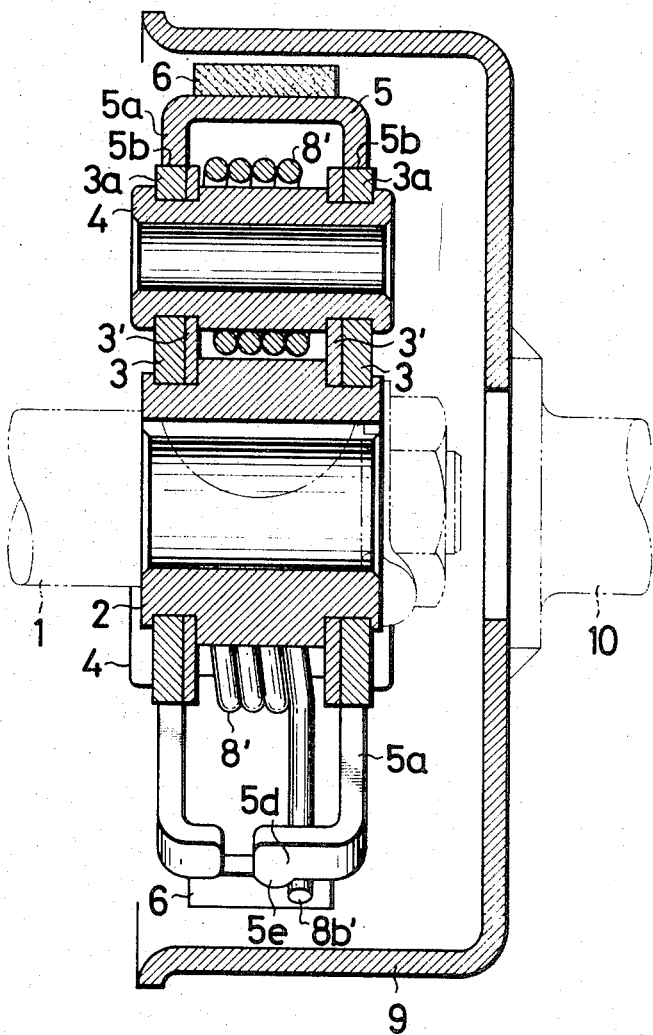
FIG. 5 is a view taken along the line V—V in FIG. 4, the view looking in the direction of the arrows.
Figure 6:
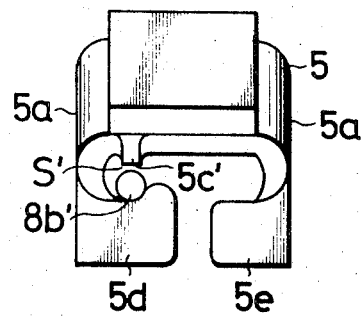
FIG. 6 is a side elevation showing the principal part as seen in the direction of the arrow VI in FIG. 4.

FIGS. 4 to 6 shows an embodiment wherein a torsion spring 8' is substituted for the return spring 8. The torsion spring 8' is wound around the stud pin 4 a suitable number of turns, with its opposite ends 8'b caught on holding portions 5d formed at the circumferentially opposite ends of the shoe 5. The holding portion 5d is formed with an upwardly extending projection 5e for retaining each end 8'd of the torsion spring 8'. As in the embodiment of FIGS. 1 to 3, the movement of the opposite ends of the torsion spring 8' is limited by restricting projections 5'c at both ends of the shoe 5. In the case where the clutching action of the shoe 5 is controlled by the torsion spring 8', it is impossible to prevent the shoe 5 from removing or dropping in the axial direction, so that as seen in FIGS. 4 and 5 there are provided on the inner faces of the brackets 3 guide plates 3' for preventing the removal of the shoe 5. The clutch of this embodiment will operate in the same manner as that of the foregoing embodiment.

It will be apparent from the above description that the shoe 5 and return spring 8 or torsion spring 8' extend in the circumferential direction symmetrically with respect to the stud pin 4. This arrangement ensures engagement and disengagement of the clutch always in balanced state for an efficient operation.

Figure 7:
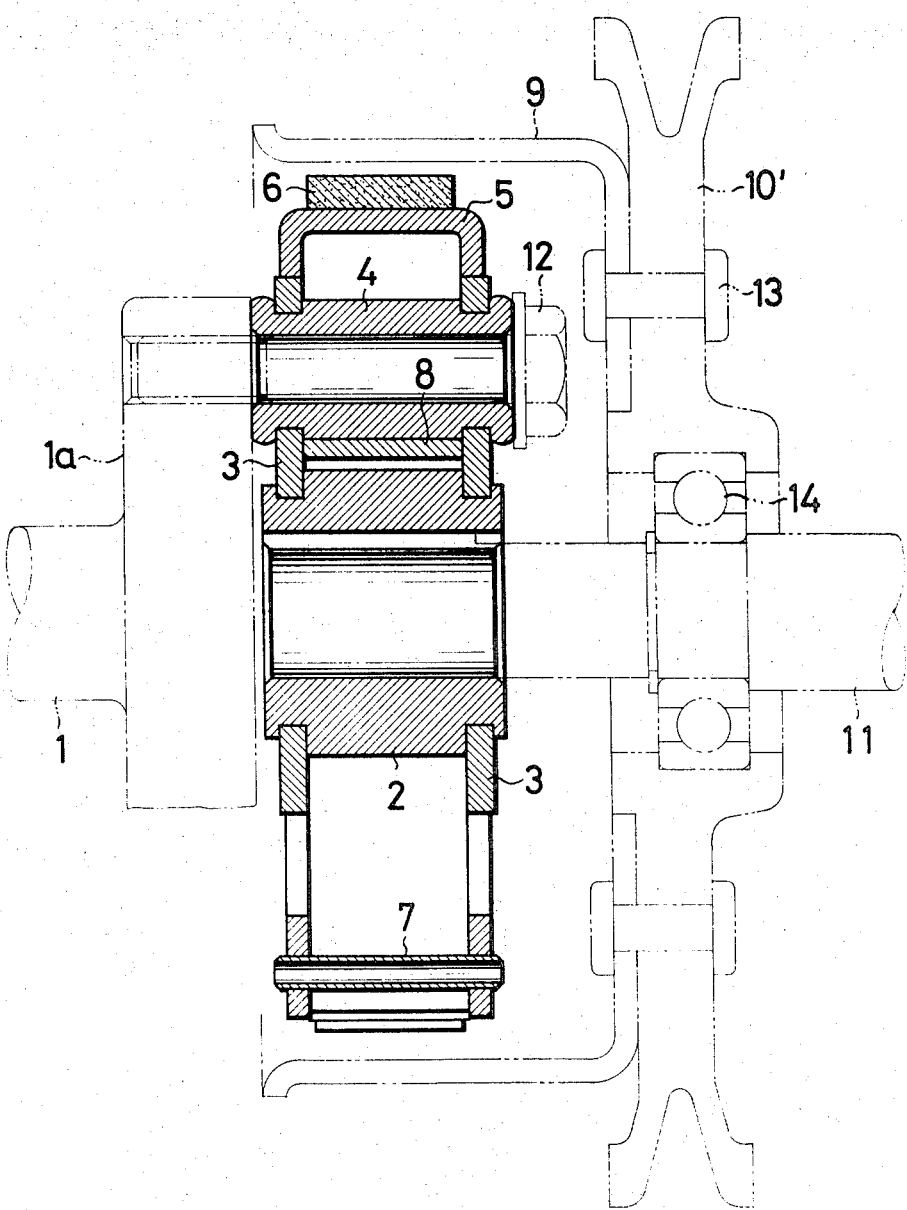
FIG. 7 is a view showing a modified power transmission system employing the clutch of this invention.

FIG. 7 illustrates a power transmission system wherein a power take-off shaft 11 is connected to the centrifugal clutch described above. A flange 1a is mounted on the end of the input shaft 1 and directly connected to the brackets 3 by a bolt 12 extending through the inner hole of the stud pin 4. The end of the power take-off shaft 11 is secured to the clutch boss 2. Thus, the input shaft 1 and the power take-off shaft 11 will be driven together. On the other hand, a pulley 10' is fixed to the drum 9 by rivets 13 and an unillustrated belt reeved around the pulley 10' transmits the power to a device to be driven. A bearing such as a ball bearing 14 is interposed between the pulley 10' and the power take-off shaft 11.

The power take-off shaft 11 is usually employed for power taking-off for a device such as pump, fan, generator or the like wherein clutching action is not required generally.

Figure 8:
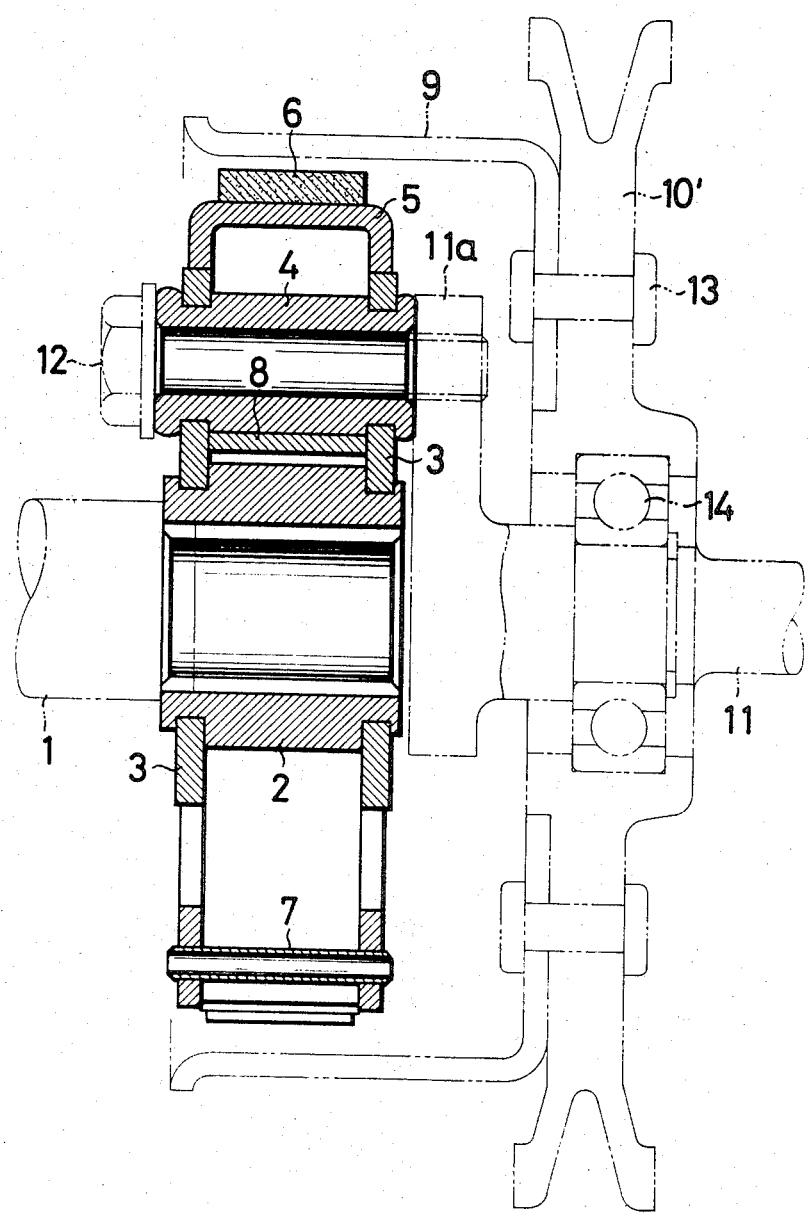
FIG. 8 is a view showing another modified power transmission system including the clutch of this invention.

FIG. 8 shows a case wherein the input shaft 1 is secured to the clutch boss 2 and the power take-off shaft 11 is connected to the brackets 3 by means of flange 11a mounted on the power take-off shaft 11.

What is claimed is:

1. A centrifugal clutch comprising a rotatable driving boss, two brackets mounted on the opposite ends of the boss in spaced parallel relationship, each bracket being provided with a plurality of radially extending guide projections, arcuate shoes each defined by parallel side plates and a connecting web, each side plate having a guide recess receiving each pair of the opposite guide projections of said brackets so as to be movable only radially of the clutch, a lining on the connecting web, stud pins extending between and secured to each pair of the opposing guide projections, holding means provided at the circumferentially opposite ends of each of said side plates of said shoes, and extending between the side plates, spring means having a longitudinally middle portion in engagement with the outer periphery of each of said stud pins and opposite ends engageable with said holding means so as to urge said shoes toward the clutch boss, and restricting means provided at the circumferentially opposite ends of the webs of said shoes for limiting the movement of the opposite ends of said spring means away from the holding means when said spring means are forced outward under the action of a centrifugal force, said spring means preventing said shoes from leaving the guide projections in the axial direction of the clutch.

2. The centrifugal clutch as claimed in claim 1 wherein each of said spring means is a leaf spring and is disposed within a space defined by said brackets and the side plates of said shoe, said leaf spring having a width sufficient to prevent said shoe from leaving the guide projections axially of the clutch.

3. The centrifugal clutch as claimed in claim 1 wherein each of said spring means is a torsion spring and guide plates are provided on the opposing inner side faces of said brackets to prevent said shoe from leaving the guide projections axially of the clutch.

* * * * *